(No Model.) 2 Sheets—Sheet 2.
W. S. G. BAKER.
CAR BRAKE.
No. 572,518. Patented Dec. 8, 1896.
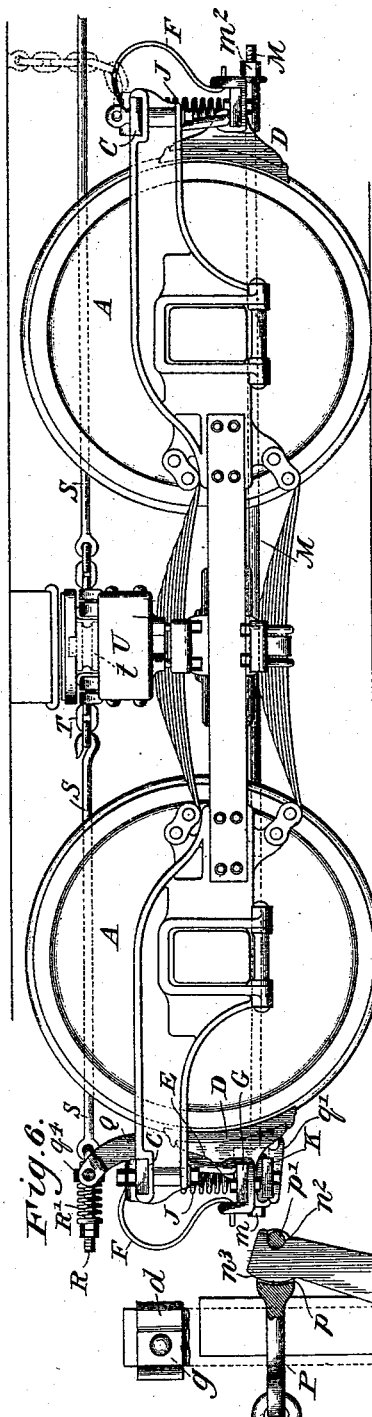
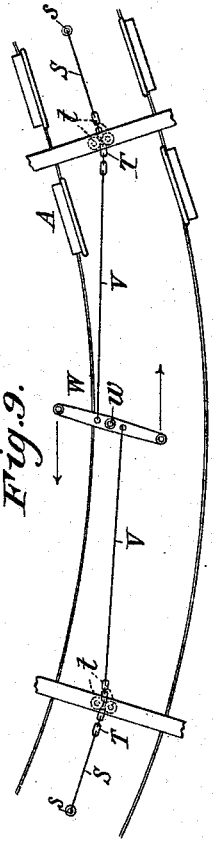
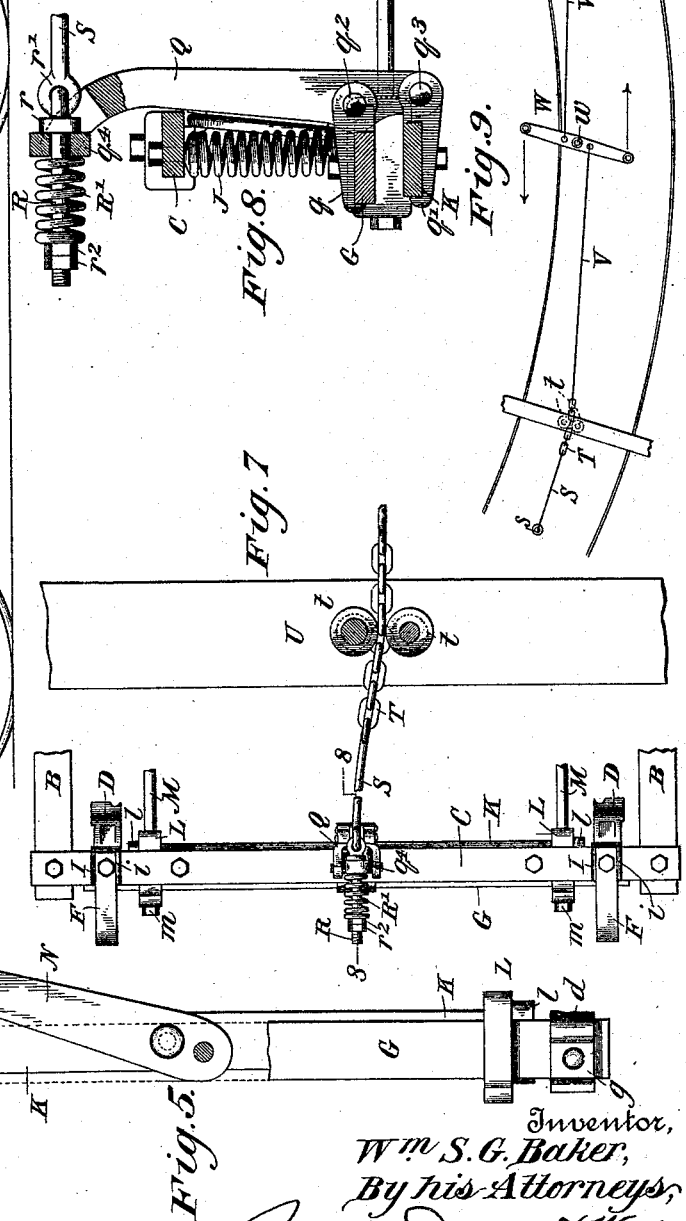
Witnesses
Inventor,
Wm. S. G. Baker,
By his Attorneys,

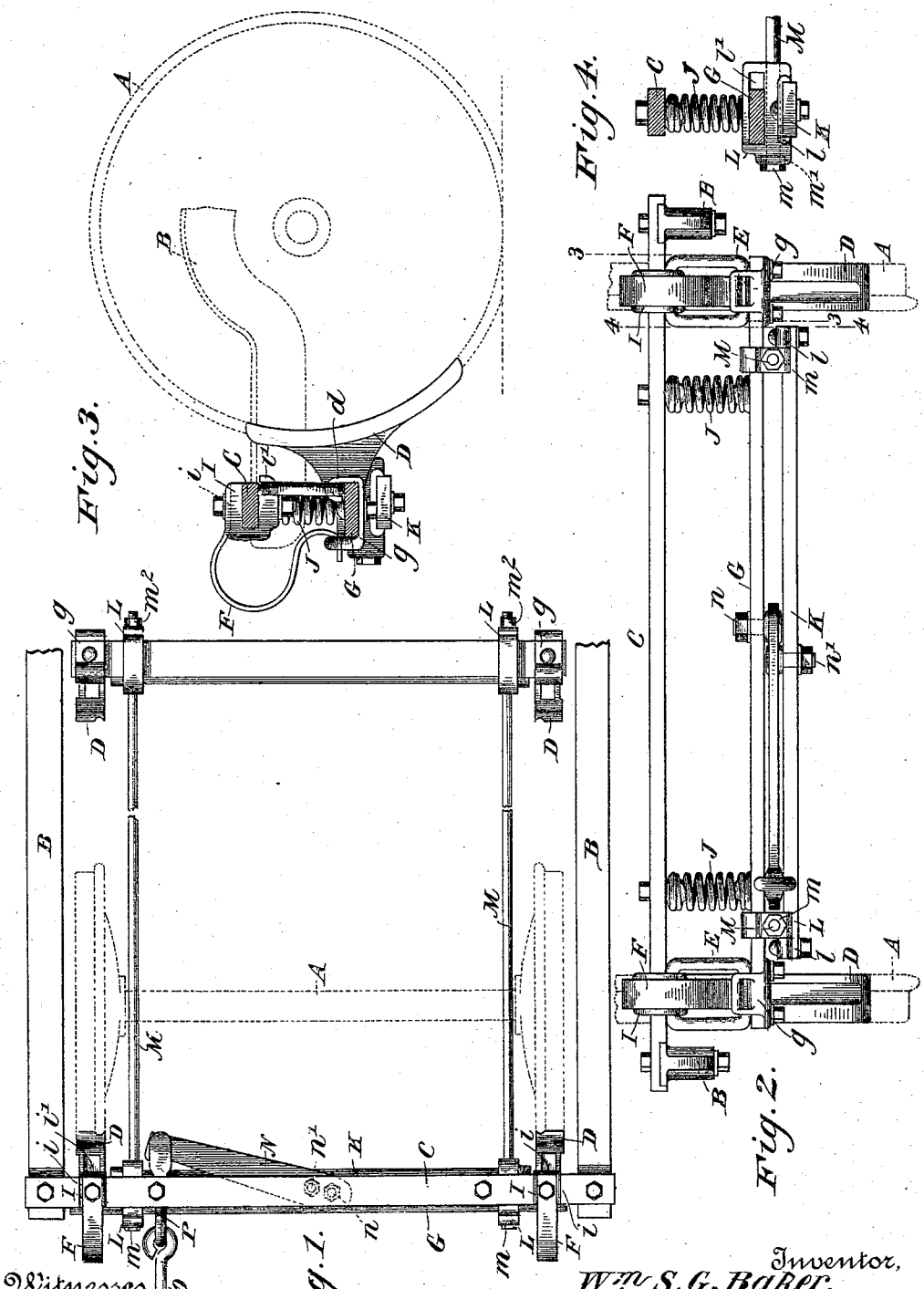

UNITED STATES PATENT OFFICE.

WILLIAM S. G. BAKER, OF BALTIMORE, MARYLAND.

CAR-BRAKE.

SPECIFICATION forming part of Letters Patent No. 572,518, dated December 8, 1896.

Application filed September 25, 1896. Serial No. 606,940. (No model.)

*To all whom it may concern:*

Be it known that I, WILLIAM S. G. BAKER, a citizen of the United States, residing in Baltimore, in the State of Maryland, have invented certain new and useful Improvements in Car-Brakes, of which the following is a specification.

My invention relates more particularly to that class of car-brakes in which the brake-shoes are suspended by swinging links and in which equalizing-beams joined by longitudinal rods are connected with the brake-beams and operated by lever mechanism to apply the brakes. In this class of brakes the parts are often loose and liable to rattle, thus increasing wear on the mechanism, and they are liable to slip when the brake-shoes are applied, producing what is known as "kicking." Both the rattling and kicking are objectionable, and by my invention I seek to overcome both of these objectionable features or to reduce them to a minimum. I firmly secure the brake-shoes to the brake-beams and suspend them from the truck-frame by links which are held firmly in their seats by compressed springs interposed between the brake-beams and the truck-frame. These springs not only hold the links in their seats, but also prevent rattling and assist the springs in withdrawing the shoes from the wheels when the brake mechanism is relieved. The precise details of the mechanism for supporting and operating the brakes will be elaborated farther on.

My improved brake mechanism is applicable with equal facility to four-wheeled trucks and to center-bearing trucks, in which the brakes are usually operated by quadrants and flexible connections. I dispense with the quadrants and the usual flexible connections and make these connections more direct and efficient.

In the accompanying drawings, Figure 1 is a plan view of a part of a car-truck with my improved brake mechanism applied. Fig. 2 is an end elevation of a car-truck equipped with my improved brake mechanism. Fig. 3 shows a transverse section of the brake mechanism at one end of the car on the line 3 3 of Fig. 2. Fig. 4 shows a detail view in transverse section on the line 4 4 of Fig. 2. Fig. 5 is a view on an enlarged scale, partly in plan and partly in section, of the brake-beam and equalizing-beam and the lever mechanism pivoted to them. Fig. 6 shows a side elevation of a center-bearing truck with my improved brake mechanism applied to opposite ends thereof. Fig. 7 shows a plan view of the brake mechanism and a plan view of the guide-pulleys carried by the center bolster. Fig. 8 shows, on an enlarged scale and in section on the line 8 8 of Fig. 7, details of construction of the brake mechanism as modified to be applied to center-bearing trucks. Fig. 9 is a diagram showing the manner of connecting the brake mechanism of one truck with the brake mechanism of another truck on the same car.

Referring first to Figs. 1 to 5 of the drawings, which show the particular construction of brake which I prefer to apply to a four-wheeled truck, A indicates the wheels and axle at one end of the car, and B B' indicate the side beams of a truck-frame supported on the axle-boxes and connected at each end by a tie-bar C.

Brake-shoes D are suspended from the truck-frame by means of links E, and springs F, connected to the shoes and to the truck-frame, are employed for withdrawing the shoes from the wheels when the brake mechanism is relieved. At each end of the car the brake-shoes are connected by a brake-beam G. Each brake-shoe is formed with a bracket $g$, which is bolted directly to the brake-beam G. At its outer end the bracket is slotted to receive the end of the bent leaf-spring F, which is secured at its upper end in a socket $i$ in a casting or block I, bolted to the tie-bar or frame-piece C. This block is formed with a grooved flange $i'$, in which is seated the upper end of the link E, the lower end of the link being seated in a grooved flange $d$, formed on the brake-block D. The arrangement is such that the links are held in the grooved flanges without the use of caps or special contrivances. Preferably the links are suspended in the grooved flanges $i'$ before the blocks I are applied to the tie-bars C. Then the blocks are slid onto the tie-bars and these serve to cover the tops of the links, as clearly indicated in Fig. 3. In like manner the links are applied to the grooved flanges $d$ before the brake-beams are slid in endwise. After they are in place the bolts are applied and the parts made fast.

In order to prevent rattling and slipping or kicking, I interpose between the brake-beam G and the truck-frame springs J, which are held under compression. As shown, they are coiled or spiral springs, but any springs, so long as they are compressed, may be employed. The particular manner of securing or mounting the springs is also unimportant so long as they perform the function of tending to press the brake-beam downwardly away from the truck-frame. When acting thus, the links E will be held firm in their seats and rattling will be prevented as well as kicking or slipping. The springs J, inasmuch as they tend to keep an upright position, assist the springs F in withdrawing the brake-shoes from the wheels when the brake mechanism is relieved.

At each end of the car I employ an equalizing-beam K, supported from the brake-beams by brackets L. The brackets are flanged at $l$ and bolted securely to the opposite ends of the equalizing-beams, and they are slotted at $l'$ to receive the brake-beams which suspend them. The slots, as shown in Fig. 4, are somewhat wider than the brake-beams, thus permitting the brake-beams to move relatively to the equalizing-beams, or vice versa. Brake-rods M connect the equalizing-beams at opposite ends of the truck. These rods extend through the supporting-brackets L. The heads $m$ on the ends of the brake-rods are seated in sockets $m'$ in the supporting-brackets. When thus seated, the heads of the rods are prevented from turning. The opposite ends of the rods are screw-threaded and carry nuts $m^2$, by means of which a tight and even connection may be made between the equalizing-beams and proper adjustments may be made.

An operating-lever N at each end of the car is pivotally connected at $n$ and $n'$ to corresponding brake and equalizing beams. Suitable thimbles or bushings may be employed to prevent wear. The outer end of the lever N is formed with a recess $n^2$ and a curved enlargement $n^3$. The operating-rod O is connected to the lever N by means of a short link P, which is formed with a slot $p$, having an end piece $p'$, circular in cross-section. The end of the link P is formed of one piece of metal and the slot is curved correspondingly with the curvatures of the enlargement $n^3$ and the recess $n^2$ in the end of the lever.

As shown in Fig. 5, the parts are in position for ordinary operation, and it will be seen that a pivotal connection is afforded between the lever N and the link P, and at the same time the parts cannot become separated. If, however, the link P be moved to the right, as viewed in Fig. 5, in the arc of a circle sufficiently far, it may be separated from the lever N. The movement necessary to effect the separation is, however, much greater than the link P would ever be moved in ordinary operation. By this construction I am enabled to dispense with pivot-bolts or other such loose connections.

When my improvements are applied to a center-bearing truck, I preferably modify the operating mechanism slightly. The truck-frame may, of course, be of any suitable construction. I prefer, however, that illustrated in the drawings and covered by my Patent No. 553,298 of January 21, 1896. The brake-shoes are suspended in substantially the same way as are those shown in Figs. 1 to 4. Equalizing-beams are employed, and they are connected similarly to those in the four-wheeled truck before described. The lever-operating mechanism is, however, changed.

The operating-levers Q are arranged vertically instead of horizontally. Each lever Q is connected by means of arms $q$ $q'$, respectively, to the brake-beam G and equalizing-beam K. The arms $q$ $q'$ are rigidly secured to the beams, but are pivotally connected to studs $q^2$ $q^3$, projecting laterally from the lever Q. This lever is arranged centrally between the brake-shoes, as indicated in Fig. 7. At its upper end it is bifurcated, and through the head-piece $q^4$ extends a bolt R, headed at $r$ and flexibly connected at $r'$ with an operating-rod S. The shank of the bolt is screw-threaded at its outer end to receive adjusting-nuts $r^2$, and between these ends and the head $r$ is interposed a spiral spring R'. As will be observed by reference particularly to Fig. 8, the operation of the lever Q is substantially the same in effect as that of the lever N. In both instances the brake-shoes are applied to both pairs of wheels by the operation of a lever at either end of the car, this general operation being common in brakes employing equalizing-levers or equalizing-beams.

In long street-cars or those having eight wheels and employing center bearings it has been common to connect the brake mechanisms of the two sets of wheels or the two four-wheeled trucks by means of quadrants and flexible connections in order that the brakes may be operated from either end of the car. I have changed and improved the operating mechanism of center-bearing trucks in the manner illustrated in the diagram Fig. 9. The brake-rods S, before referred to, are here shown as connected at $s$ to the operating-levers Q. The ends of the rods S are secured to chains T, which extend through guide-pulleys $t$ on the center-bearing bolsters U. The opposite ends of the chains are connected to rods V, whose opposite ends are connected with a horizontally-arranged, centrally-pivoted operating-lever W. This lever is pivoted at $w$, and the rods V are connected to the lever on opposite sides of the pivot. The connections between the crank or other operating devices on the platforms are made from the outer ends of the lever W. By this arrangement the brakes at both ends of the car on all eight wheels may be applied by the operation of the lever W from either platform.

The relation of the parts is preserved at all times, even when rounding a curve, as indicated in the diagram Fig. 9. Should any variation occur in the length of the rods or the other connecting parts, it is automatically compensated for by the springs R', and these may be adjusted by means of the nuts $r^2$.

The construction and arrangement of the brake mechanism for both the single-truck and double-truck cars are such that repairs can be quickly made, while liability to breakage and wear is largely reduced.

I claim as my invention—

1. The combination with the truck-frame of the brake-shoes, the suspending links and springs held under compression at all times to produce a tension on the links, for the purpose specified.

2. The combination of the truck-frame, the brake-shoes, the brake-beam, links suspending the shoes and beam from the truck-frame, and springs held under compression and interposed between the truck-frame and the brake-beam.

3. The combination of the truck-frame, the brake-shoes, the brake-beam to which they are connected, links suspending the shoes and beam from the truck-frame, springs held under compression and interposed between the truck-frame and the brake-beam, and other springs for withdrawing the brake-shoes from the wheels.

4. The combination of the truck-frame, the blocks having the grooved flanges, the suspending-links seated in the grooved flanges, and the brake-shoes supported by the links.

5. The combination of the truck-frame, the slotted blocks adapted to slide onto the truck-frame and having grooved flanges as described, the links seated in the grooved flanges, and the brake-shoes supported by the links.

6. The combination of the brake-beam, the brake-shoes secured to the brake-beam and having the grooved flanges, the supporting-links seated in the grooved flanges, and means for supporting the links at their upper ends.

7. The combination of the brake-beam, the brake-shoes, the links suspending them, the slotted arms extending from the brake-shoes, the leaf-springs having their lower ends extending through the slots in the arms, and connections between the leaf-springs and the truck-frame, and between the upper ends of the supporting-links and the truck-frame.

8. The combination of the truck-frame, the supporting-links, the withdrawing-springs, blocks on the truck-frame having grooved flanges to support the links, and groove-seated for the leaf-withdrawing springs, and the brake-shoes supported by the links and connected with the withdrawing-springs.

9. The combination of a brake-beam, an equalizing-beam, slotted brackets connecting the brake-beam with the equalizing-beam, and an operating-lever pivotally connected with the brake-beam and equalizing-beam.

10. The combination of the brake-beams, the equalizing-beams, slotted brackets connecting the brake-beams and equalizing-beams, and brake-rods passing through the brackets to connect the equalizing-beams at opposite ends of the truck.

11. The combination of the brake-beams, the equalizing-beams, the slotted brackets connecting the brake-beams and equalizing-beams the brake-rods extending through the brackets and heads on the rods seated in sockets in the brackets.

12. The combination of a brake-beam, an equalizing-beam, and brackets formed with flanges secured to the equalizing-beam, and with slots through which the brake-beam extends.

13. The combination of an operating-lever formed with a curved enlargement and a curved recess, and a link having a slot, the opposite walls of which correspond with the enlargement or recess, for the purpose specified.

14. The combination of a link, one end of which is formed of one piece of metal with a slot having opposite curved walls and a brake-operating lever formed with a curved enlargement and a recess conforming to the walls of the slotted link.

15. The combination of the brake-levers at opposite ends of a car, rods connected with the levers, chains connected with the rods, guide-pulleys between which the chains extend, a horizontally-pivoted lever centrally arranged between the trucks of an eight-wheeled car, and rods connecting the chains with the centrally-arranged lever.

In testimony whereof I have hereunto subscribed my name.

WILLIAM S. G. BAKER.

Witnesses:
DANL. W. POWELL,
J. PAUL BAKER.